United States Patent [19]

Steck et al.

[11] Patent Number: 4,631,140
[45] Date of Patent: Dec. 23, 1986

[54] FERRIMAGNETIC PARTICLES AND THEIR PREPARATION

[75] Inventors: Werner Steck, Ludwigshafen; Helmut Jakusch, Frankenthal, both of Fed. Rep. of Germany

[73] Assignee: BASF Aktiengesellschaft, Ludwigshafen, Fed. Rep. of Germany

[21] Appl. No.: 787,086

[22] Filed: Oct. 15, 1985

[30] Foreign Application Priority Data

Oct. 18, 1984 [DE] Fed. Rep. of Germany ....... 3438093

[51] Int. Cl.$^4$ ............................................. C01G 49/08
[52] U.S. Cl. ........................... 252/62.56; 75/0.5 AA; 75/0.5 BA; 428/694; 427/48; 427/128; 360/134; 423/138; 423/140; 423/144; 423/632; 423/633; 423/634; 148/105
[58] Field of Search ..................... 75/0.5 AA, 0.5 BA; 252/62.56; 428/694; 427/48, 128; 360/134; 423/632, 633, 634, 140, 138, 144; 148/105

[56] References Cited

U.S. PATENT DOCUMENTS

| | | | |
|---|---|---|---|
| 3,117,933 | 1/1964 | Abeck | 252/62.56 |
| 3,573,980 | 6/1971 | Haller et al. | 427/48 |
| 3,725,126 | 3/1973 | Haller et al. | 360/134 |
| 3,897,354 | 7/1975 | Woditsch | 252/62.56 |
| 4,059,463 | 11/1977 | Aonuma et al. | 148/105 |
| 4,069,367 | 1/1978 | Umeki et al. | 75/0.5 AA |
| 4,122,216 | 10/1978 | Okowoe | 427/12 |
| 4,178,416 | 12/1979 | Hector | 428/694 |
| 4,273,807 | 6/1981 | Berry | 427/128 |
| 4,360,377 | 11/1982 | Steck et al. | 75/0.5 AA |

FOREIGN PATENT DOCUMENTS

| | | |
|---|---|---|
| 1432643 | 4/1976 | United Kingdom . |
| 1441183 | 5/1976 | United Kingdom . |

*Primary Examiner*—John Doll
*Assistant Examiner*—Robert L. Stoll
*Attorney, Agent, or Firm*—Keil & Weinkauf

[57] ABSTRACT

Ferrimagnetic particles which are useful as magnetic material for magnetic recording media and consist of a core of a magnetic material exhibiting multiaxial anisotropy and a coating which surrounds the core and is composed of a magnetic material possessing uniaxial anisotropy, and a process for their preparation.

3 Claims, No Drawings

FERRIMAGNETIC PARTICLES AND THEIR PREPARATION

The present invention relates to ferrimagnetic particles which are suitable as magnetic material for magnetic recording media, and to a process for the preparation of these particles.

The trend toward higher and higher storage densities and a steady increase in the signal-to-noise ratio in magnetic recording media necessitates magnetic recording layers possessing even higher coercive forces. A number of cobalt-modified iron oxides have already been suggested as being suitable for this purpose. Depending on the type of cobalt modification, the resulting products can be classified as either multiaxial or uniaxial in terms of their magnetic anisotropy.

Multiaxial particles have long been known. They consist of $FeO_x$ in which x is from 1.33 to 1.5 and which has been doped uniformly in the particle volume with cobalt(II). Important magnetic properties, e.g. coercive force and residual induction, of such particle systems exhibit a pronounced dependence on temperature. Moreover, when used in magnetic recording layers, magnetic materials of this type have an adverse effect on the signal to print-through ratio and result in a drop in output level owing to magnetostrictive effects. The preparation of iron oxide particles which are uniformly doped with cobalt is known and is described in, inter alia, German Pat. No. 1,226,997, German Published Application DAS No. 2,221,218 and German Laid-Open Application DOS No. 2,710,776.

To overcome the known disadvantages of the multiaxial particles, iron oxides which have a higher coercive force, consist of a ferrimagnetic core material possessing uniaxial anisotropy, e.g. $\gamma$-$Fe_2O_3$, and have a uniaxial coating which comprises oxides of iron and of cobalt and is likewise magnetic have been developed. The preparation and the properties of such particles are known per se and are described in, for example, German Published Applications DAS No. 2,235,383 and DAS No. 1,907,236, German Pat. Nos. 2,243,231, 2,410,517 and 2,705,967 and EP-A No. 14 903. The iron oxides prepared in this manner, which have a higher coercive force and are substantially uniaxial, exhibit better thermal behavior, signal to print-through ratio and magnetostriction than the multiaxial particles. However, uniaxial magnetic materials have disadvantages with regard to the recording of fairly short wavelengths with very narrow head gaps.

It is an object of the present invention to provide magnetic particles as magnetic material for magnetic recording media, which on the one hand have a high coercive force without exhibiting thermal or mechanical instability, and on the other hand permit the magnetic recording medium to be used for recording short wavelengths with an appropriately small head gap.

We have found that this object is achieved and that, surprisingly, ferrimagnetic particles as materials for magnetic recording media possess the required properties if their core consists of a magnetic material exhibiting multiaxial anisotropy, and the coating surrounding the core is composed of a magnetic material possessing uniaxial anisotropy.

In an advantageous embodiment, the core of the novel ferrimagnetic particles consists of ferrimagnetic $FeO_x$ in which x is from 1.33 to 1.50, preferably from 1.45 to 1.50, and which is doped uniformly with cobalt(II) ions throughout the volume of the core. Both acicular and isometric particles are suitable as core material depending on the intended use. The coating which surrounds this core and is uniaxially anisotropic contains not only oxygen but also cobalt(II), iron(II) and iron(III) ions. The core and/or coating material may furthermore contain small amounts of zinc ions, in particular from 1.2 to 8% by weight, based on the total material.

In respect of their magnetic properties, the particles according to the invention exhibit behavior between that of a purely uniaxial material and that of a purely multiaxial material. Furthermore, the temperature dependence of these particles is substantially better than that of particles possessing purely multiaxial anisotropy.

The novel ferrimagnetic particles are prepared using, as core material, iron oxides, e.g. $Fe_3O_4$, $\gamma$-$Fe_2O_3$ or the berthollides, $FeO_x$, where x is from 1.3 to 1.5, which are uniformly doped with cobalt throughout their volume, i.e. are multiaxial and have a high coercive force.

The preparation of these magnetic oxides is known. These multiaxial Co-doped iron oxides are suspended in a conventional manner in a thoroughly stirred aqueous, alkaline medium in the presence of Fe(II) and/or Co(II) and, if required, zinc(II) ions, the pH of the suspension after the precipitation of the Me(II) ions preferably being greater than 10. The temperature is from 30° to 100° C. or in the region of the boiling point of the suspension. It has proven useful to choose a reaction time of from 1 to 10, preferably from 2 to 8, hours. Coating of the multiaxial core material with Me(II) ions is carried out either in the absence of oxidizing agents (atmospheric oxygen can be excluded by, for example, blanketing with nitrogen) or in the presence of air. In the latter case, some of the Fe(II) ions are oxidized to Fe(III) ions. When the Co—$FeO_x$ core has been coated with Co(II) and/or Fe(II) and/or Fe(III) and, where relevant, Zn(II), the solid is isolated from the mother liquor, washed, and dried at as high as about 180° C. If the drying temperature chosen is above 80° C., drying is preferably carried out under an inert gas, e.g. nitrogen and/or noble gases.

The most important use of the cobalt-containing magnetic iron oxides according to the invention is as a magnetic material in the preparation of magnetic recording media. When they are used, the recording properties, which are influenced by the coercive force and the residue induction, can be modified in an advantageous and surprising manner. With their high relative remanence in all three orthogonal directions, they can be particularly advantageously used in the preparation of magnetic recording meoia where it is intended to utilize the advantages of recording by means of the effective vertical component in order to increase bit density and to store high frequencies.

Tne recording media are prepared in a conventional manner, magnetic materials being dispersed in polymeric binders. Binders which are suitable for this purpose are conventional compounds, such as homopolymers and copolymers of polyvinyl derivatives, polyurethanes, polyesters and the like. The binders are used in solution in suitable organic solvents, which can, if required, contain further additives. The magnetic layers are applied onto rigid or flexible bases, such as disks, films and cards.

The Examples which follow illustrate the invention and compare it with prior art experiments. In the comparative experiments, the magnetic particles prepared according to the invention are in each case oxidized completely with air to multiaxial $\gamma$-Fe$_2$O$_3$ which is doped uniformly throughout the entire particle volume with cobalt(II) and, if appropriate, Fe(II) and Zn(II). Thus, the homogeneously Me(II)--doped $\gamma$-Fe$_2$O$_3$ magnetic oxides obtained after the oxidation possess higher values for M$_R$ and VH$_c$-30. The amounts of Co(II) and Fe(II) are stated in percent by weight, based on the total compound. The magnetic properties of the powder samples are measured using a vibrating-sample magnetometer in a magnetic field of 160 kA/m, or after biasing in a discharge capacitor in a vibrating-sample magnetometer. In the case of the powder measurements, the coercive force, H$_c$, measured in [kA/m], was based on a tap density $\phi$ of 1.2 g/cm$^3$. The specific remanence (M$^r$/$\phi$) and the saturation magnetization (M$_m$/$\phi$) are each stated in [nTm$^3$/g]. The saturation magnetization and residual induction of tapes are stated in [mT]. It is known that magnetic powders possessing strictly multi-axial anisotropy have a relative remanence of 0.83, whereas the corresponding figure for purely uniaxial systems is 0.50. Hence, if the M$_R$ values are between 0.50 and 0.83, it can be assumed that the particles possess more or less pronounced hybrid character.

The temperature dependence of the coercive force, expressed by the parameter VH$_c$-30, in kAm$^{-1}$/10° C., is determined as follows. In a vibrating-sample magnetometer, the coercive force of the sample is determined at 20° C. (H$_c$ 1) and after the sample chamber has been heated to 40° C. (H$_c$ 2). The value VH$_c$-30 is calculated from the expression $$VH_c^{-30} = \frac{H_c 1 - H_c 2}{2}$$

The specific surface area S$_N$ of the pigments is determined, in m$^2$/g by the BET method, i.e. nitrogen is adsorbed onto weighed, evacuated, gas-free pigment samples. The amount of nitrogen adsorbed, corresponding to the difference in weight before and after adsorption, is converted to the area occupied and expressed as a ratio of the sample weight.

EXAMPLE 1

A: Preparation of Co/$\alpha$-FeOOH

In a heatable metal container provided with a stirrer, an air inlet and a nitrogen gas inlet, 16.53 kg of Na$_2$CO$_3$ were dissolved in 110 l of water and the solution was brought to 47° C. 10 l of a solution consisting of 302.4 g of CoCl$_2$.6H$_2$O, 3,239 g of FeCl$_2$ and water were then added in the course of 5 minutes, while stirring at 130 rpm and passing in 480 l (S.T.P.)/h of nitrogen. After 10 minutes, 300 l (S.T.P.)/h of air were passed in instead of the nitrogen, stirring being continued and the temperature being maintained at 47° C. Oxidation of the Fe(II) to acicular cobalt-doped $\alpha$-FeOOH was complete when air had been passed in for 5 hours. The suspension was cooled to 22° C., after which it was filtered, and the Co/$\alpha$-FeOOH was washed with water and dried at 130° C. in a through-circulation drier.

Sample A 1 (Co/$\alpha$-FeOOH): S$_{N2}$=81.3 m$^2$/g; 3% of weight of Co.

B: Preparation of Co/$\gamma$-Fe$_2$O$_3$ from Co/$\alpha$-FeOOH (A 1)

The Co/$\alpha$-FeOOH was mixed thoroughly with 2.5% by weight of stearic acid, and the mixture was kept at 360° C. in a stream of 100 l (S.T.P.)/h of nitrogen and 100 l (S.T.P.)/h of hydrogen for 30 minutes in a batch-wise rotary tube furnace. Before entering the furnace, the gas mixture was passed through water at 60° C. The resulting Co-containing Fe$_3$O$_4$ was then oxidized to Co/$\gamma$-Fe$_2$O$_3$ in the course of 30 minutes at 360° C. in a stream of 100 l (S.T.P.)/h of air in a furnace of the same design.

Sample B 1: Hc=65 kA/m, S$_{N2}$=21.4 m$^2$/g, M$_m$/$\phi$=83 nTm$^3$/g, pH value=9.2, M$_r$/$\phi$=67 nTm$^3$/g, Co: 3.4% by weight, M$_r$/M$_m$=0.81.

C: Coating the Co/$\gamma$-Fe$_2$O$_3$ (B 1) with cobalt

C.1

60 g of Co/$\gamma$-Fe$_2$O$_3$ were dispersed in 300 ml of water with the addition of 4% by weight of Co in the form of CoCl$_2$.6H$_2$O and with thorough stirring, the reaction vessel being blanketed with nitrogen during the entire course of the reaction. After a period of 30 minutes, the temperature was brought to 50° C. 38 ml of a 31.3% strength FeCl$_2$ solution, corresponding to 12% by weight, based on Co/$\gamma$-Fe$_2$O$_3$, of Fe(II) were then added, and 50 ml of a 50% strength aqueous sodium hydroxide solution were introduced after 10 minutes. The mixture was stirred for 6 hours at 50° C., after which it was cooled to 22° C. and filtered, and the filter cake was washed with water and dried in a drying oven at 80° C. under reduced pressure (sample C 1).

C.2

The procedure described under C.1 was followed, except that 6% by weight of Co(II) and 16% by weight of Fe(II) were used, the percentages in each case being based on Co/$\gamma$-Fe$_2$O$_3$ (Sample C 2).

C.3

The procedure described under C.1 was followed, except that 8% by weight of Co(II) and 20% by weight of Fe(II) were used, the percentages in each case being based on Co/$\gamma$-Fe$_2$O$_3$ (Sample C 3).

The magnetic properties and the temperature dependence of the coercive force,, expressed as VH$_c$-30, are summarized in Table 1.

COMPARATIVE EXPERIMENT 1

To permit comparison, the novel particle system was converted to a purely multiaxial system by oxidizing portions of the samples C 1, C 2 and C 3 in a stream of 50 l (S.T.P.)/h of air at 380° C. in the course of 30 minutes. The properties of the resulting comparative samples C 1-Ox, C 2-Ox and C 3-Ox are likewise shown in Table 1.

TABLE 1

| Sample | Doping with Co $\alpha$-FeOH (%) | Shell (%) | Fe(II) (a) on doping (b) after oxidation | Comment or drying and oxidizing | Hc (kA/m) | M$_r$/M$_m$ | M$_r$/$\theta$ (nTm$^3$/g) | VH$_c$-30 (kA/m/10° C.) |
|---|---|---|---|---|---|---|---|---|
| B 1 | 3.2 | — | (b) <0.2 | starting | 65 | 0.81 | 67 | 7.1 |

TABLE 1-continued

| Sample | Doping with Co α-FeOH (%) | Shell (%) | Fe(II) (a) on doping (b) after oxidation | Comment or drying and oxidizing material | Hc (kA/m) | $M_r/M_m$ | $M_r/\theta$ (nTm³/g) | $VH_c$-30 (kA/m/10° C.) |
|---|---|---|---|---|---|---|---|---|
| C 1    | 3.2 | 4 | (a) 12  | 80° C.  | 108 | 0.68 | 52 | 6.8  |
| C 1-Ox |     |   | (b) <1  | 380° C. | 106 | 0.87 | 60 | 10.9 |
| C 2    | 3.2 | 6 | (a) 16  | 80° C.  | 110 | 0.70 | 70 | 6.7  |
| C 2-Ox |     |   | (b) <1  | 380° C. | 111 | 0.86 | 63 | 10.2 |
| C 3    | 3.2 | 8 | (a) 20  | 80° C.  | 105 | 0.71 | 64 | 6.6  |
| C 3-Ox |     |   | (b) <1  | 380° C. | 113 | 0.86 | 59 | 8.0  |

EXAMPLE 2

(A)

In a 10 l glass vessel provided with a reflux condenser, a stirrer and a pH electrode, 1,211 g of $FeSO_4.7H_2O$ and 16.8 g of $CoSO_4.7H_2O$ were dissolved in water with stirring to give a solution having a total volume of 6 l. 3.2 ml of concentrated sulfuric acid were added, followed by 5.4 g of $NaH_2PO_4.2H_2O$. At the same time, the solution was gassed with 300 l (S.T.P.)/h of nitrogen and the temperature was brought to 50° C. 575 ml of a 15.7% strength sodium hydroxide solution were then added in the course of 10 minutes. The degree of precipitation was 30%, based on Me(II).

Instead of nitrogen, 600 l (S.T.P.)/h of air were then passed in until the pH had fallen below 4, this taking 45 minutes. 10 minutes after this point, the pH was brought to 5.1, at 50° C., with continued introduction of air and with stirring, by dropwise addition of 15.7% strength sodium hydroxide solution, and was kept at 5.1–5.2 during the entire growth phase, which lasted 110 minutes. The suspension was then cooled to 30° C., and the pH was brought to 9.5 with 15.7% strength sodium hydroxide solution. Stirring was continued for 2 hours, after which the mixture was filtered and the filter cake was washed with water until the filtrate was $SO_4^{2-}$-free. Finally, the filter cake was dried at 110° C. The data for the sample A 2 obtained in this manner are shown in Table 2. Sample A 3, A 4, A 5 and A 6:

The procedure described in Example 2 was followed, except that the ratio of Fe(II) to Co(II) was varied in the manner shown in Table 2. On average, 0.8% by weight of $PO_4^{3-}$ ions were shown to be present in the Co/α-FeOOH in each case. The reaction conditions and results are summarized in Table 2.

TABLE 2

| Example 2 Sample: | $FeSO_4.7H_2O$ (g) | $CoSO_4.7H_2O$ (g) | Initially taken Co(II)[1] (% by weight) | Duration of synthesis Nucleation phase (min) | Duration of synthesis Growth (min) | $S_{N2}$ for Co/α—FeOOH (m²/g) |
|---|---|---|---|---|---|---|
| A 2 | 1,211 | 16.8 | 0.9 | 45 | 110 | 44 |
| A 3 | 1,207 | 22.4 | 1.2 | 45 | 100 | 46 |
| A 4 | 1,202 | 29.9 | 1.6 | 45 | 105 | 62 |
| A 5 | 1,197 | 37.3 | 2.0 | 40 | 95  | 60 |
| A 6 | 1,191 | 46.7 | 2.5 | 40 | 100 | 66 |

[1]Based on the amount of α-FeOOH which can form from the amount of $FeSO_4.7H_2O$.

(B)

120 g of each of the Co/α-FeOOH samples A 2 to A 6 were reduced to $Co/Fe_3O_4$ in a rotary tube furnace in the course of 30 minutes at 440° C. in a stream of 100 l (S.T.P.)/h of hydrogen. Before entering the reduction tube, the stream of $H_2$ was passed through water at 60° C. When the reduction was complete, the magnetite sample was oxidized to $Co/\gamma$-$Fe_2O_3$ in the course of 30 minutes at 320° C. in a stream of 50 l (S.T.P.)/h of air in a furnace of the same design. The properties of the $Co/\gamma$-$Fe_2O_3$ samples B 2 to B 6 are shown in Table 3.

TABLE 3

| Sample | Starting material | $H_c$ | $M_r/\theta$ | $M_r/M_m$ |
|---|---|---|---|---|
| B 2 | A 2 | 21 | 42 | 0.54 |
| B 3 | A 3 | 24 | 47 | 0.57 |
| B 4 | A 4 | 28 | 51 | 0.61 |
| B 5 | A 5 | 34 | 56 | 0.68 |
| B 6 | A 6 | 42 | 62 | 0.75 |

(C)

The procedure described in Example 1 under C 1 was followed, and 60 g of each of the samples B 2 to B 6 were coated with Co(II) ions from cobalt chloride and Fe(II) ions from iron(II) chloride in the amounts shown in Table 4.

TABLE 4

| Example | Starting material | Fe(II) % by weight, based on starting material | Co(II) % by weight, based on starting material |
|---|---|---|---|
| C 4 | B 2 | 6  | 2 |
| C 5 | B 3 | 15 | 5 |
| C 6 | B 4 | 6  | 2 |
| C 7 | B 5 | 15 | 5 |
| C 8 | B 6 | 0  | 2 |

The properties of the magnetic oxides are shown in Table 5.

COMPARATIVE EXPERIMENT 2

Portions of samples C 4 to C 8 were oxidized in a stream of 50 l (S.T.P.)/h of air in the course of 30 minutes at 320° C. The properties of the resulting samples C 4-Ox to C 8-Ox are likewise shown in Table 5.

TABLE 5

| Sample | $H_c$ | $M_r/\theta$ | $M_r/M_m$ | $VH_c$-30 |
|---|---|---|---|---|
| C 4    | 35 | 50 | 0.57 | — |
| C 4-Ox | 30 | 54 | 0.62 | — |

TABLE 5-continued

| Sample | $H_c$ | $M_r/\theta$ | $M_r/M_m$ | $VH_c$-30 |
|---|---|---|---|---|
| C 5 | 64 | 54 | 0.65 | — |
| C 5-Ox | 52 | 60 | 0.74 | — |
| C 6 | 39 | 51 | 0.58 | 4.2 |
| C 6-Ox | 40 | 62 | 0.72 | 5.3 |
| C 7 | 71 | 55 | 0.67 | 4.6 |
| C 7-Ox | 72 | 69 | 0.85 | 6.8 |
| C 8 | 45 | 57 | 0.72 | 4.2 |
| C 8-Ox | 52 | 65 | 0.80 | 5.0 |

EXAMPLE 3

In the 10 l glass apparatus described in Example 2 under A, 1,112 g of $FeSO_4$. $7H_2O$ were dissolved in water to give 6 l of solution. 3.2 ml of concentrated $H_2SO_4$ were then added to the stirred solution, followed by 5.4 g of $NaH_2PO_4$. $2H_2O$. At the same time, the solution was gassed with 300 l (S.T.P.)/h of nitrogen, and the temperature was adjusted to 20° C. Thereafter, 1,235 ml of 15% strength NaOH (5.6 moles) were added in the course of 5 minutes. This corresponded to a degree of precipitation of 70%, based on the Me(II) ions.

Instead of nitrogen, 600 l (S.T.P.)/h of air were then passed in at 20° C. until the pH had fallen to below 4, this taking 260 minutes. The air was then replaced with nitrogen, and 167.8 g of $CoSO_4$.$7H_2O$, dissolved in 200 ml of water, were introduced. The pH was then brought to 12 with NaOH, and the suspension was heated at 68° C. under $N_2$ and kept at this temperature for 3 hours. It was cooled to 22° C. and then filtered, and the filter cake was washed with water and dried in a drying oven at 50° C. under reduced pressure.

100 g of this sample A 7, a cobalt-doped isometric agnetite, were oxidized with air in the course of 30 minutes at 360° C. (cobalt-modified gamma-iron(III) oxide, sample B 7).

Using the procedure described in Example 1 under C 1, this sample B 7 was provided with a coating containing 9% by weight of iron(II) ions and 3% by weight of cobalt(II) ions (sample C 9).

The properties of these samples are shown in Table 6.

TABLE 6

| Sample | $H_c$ | $M_m/\theta$ | $M_r/\theta$ | $M_r/M_m$ |
|---|---|---|---|---|
| A 7 | 56.0 | 87 | 52 | 0.59 |
| B 7 | 104.0 | 74 | 59 | 0.79 |
| C 9 | 110.0 | 70 | 50 | 0.71 |

EXAMPLE 4

50 parts, in each case, of the magnetic iron oxides shown in Table 7, 3 parts of a long-chain, amphoteric, organophilic dispersant, 0.05 part of a silicone oil, 0.5 part of an isomer mixture of a carboxylic acid, 6.6 parts of a commercial isocyanate-free polyester urethane obtained from adipic acid, butane-1,4-diol and 4,4-dicyanatodiphenylmethane and having a K value of 61 (measured as a 1% strength solution in tetrahydrofuran), 25 parts of a vinyl chloride/methyl maleate copolymer having a K value of 59 (likewise measured as a 1% strength solution in tetrahydrofuran) and 78 parts of a mixture of equal amounts of tetrahydrofuran and 1,4-dioxane were introduced into a ball mill having a capacity of 250 parts by volume and containing 100 parts of steel balls of 2 mm diameter, the stated binders being introduced in the form of their solution in the stated solvent mixture. After dispersing had been carried out for 3.5 hours, the magnetic dispersion was filtered and then cast on a 12 μm thick polyethylene terephthalate film by means of a conventional coating apparatus so that, after drying in a drying tunnel followed by calendering with a multiroll calender heated at 80° C., the resulting layer was 5.2 μm thick. The magnetic properties measured on the magnetic layer are shown in Table 7.

TABLE 7

| Iron oxide sample used | $H_c$ | $M_r$ | $M_r/M_m$ | $VH_c$-30 |
|---|---|---|---|---|
| C 6 | 36 | 129 | 0.66 | 3.8 |
| C 6-Ox | 42 | 152 | 0.82 | 6.0 |
| C 7 | 63 | 132 | 0.68 | 5.9 |
| C 7-Ox | 70 | 160 | 0.81 | 8.2 |
| C 8 | 47 | 143 | 0.81 | 5.9 |
| C 8-Ox | 55 | 151 | 0.86 | 9.5 |

EXAMPLE 5

1,269 ml of a 30.8% strength technical-grade $FeCl_2$ solution were initially taken at 20° C. in the 10 l glass apparatus described in Example 2 under A, and 300 l (S.T.P.)/h of nitrogen were passed through the stirred solution. 55.26 g of $CoCl_2.6H_2O$ and 14.3 g of $ZnCl_2$ were added, after which water was introduced until the volume of the solution was 6 l.

1,371 ml of 15.1% strength sodium hydroxide solution were then introduced in the course of 8 minutes, and stirring was continued for a further 10 minutes.

Instead of nitrogen, 600 l (S.T.P.)/h of air were then passed in at 20° C. until the pH of the suspension had fallen to 4, this taking 140 minutes. Stirring was then continued for 10 minutes, nitrogen being passed in once again instead of air. The pH was then brought to 9.5 with NaOH while maintaining the passage of nitrogen, and the mixture was heated to 80° C. in the course of 150 minutes. This temperature was maintained for 3 hours, after which the suspension was cooled overnight to 22° C. and filtered, and the product was washed and dried at 50° C. under reduced pressure in a drying oven to give sample A 8. Chemical analysis of A 8 showed that it contained 3.4% by weight of cobalt and 1.7% by weight of zinc.

100 g of sample A 8 were oxidized to sample A 8-Ox in a stream of 50 l (S.T.P.)/h of air in the course of 30 minutes at 350° C. in a rotary tube furnace.

Using the procedure described in Example 1 under C 1, 40 g of sample A 8-Ox were coated with 4% by weight of Co(II) and 12% by weight of Fe(II). To do this, the metal chlorides, 200 ml of water and 35 ml of 48% strength NaOH were used. Drying under reduced pressure gave sample C 10.

The properties of samples A 8, A 8-Ox and C 10 are shown in Table 8.

TABLE 8

| Sample | $H_c$ | $M_m/\theta$ | $M_r/\theta$ | $M_r/M_m$ | $VH_c$-30 |
|---|---|---|---|---|---|
| A 8 | 30 | 95 | 55 | 0.58 | — |
| A 8-Ox | 50 | 84 | 66 | 0.78 | 7.3 |
| C 10 | 62 | 80 | 48 | 0.61 | — |

We claim:

1. Ferrimagnetic particles which are useful as magnetic material for magnetic recording media, which particles comprise a core of a magnetic material exhibiting multiaxial anisotropy and consisting essentially of a ferrimagnetic $FeO_x$ which which is doped uniformly throughout its volume with cobalt(II) ions and in which x is from 1.33 to 1.50, and of a magnetic coating which surrounds the core, possesses uniaxial anisotropy, and consists essentially of Co(II), Fe(II), Fe(III) and oxygen.

2. Ferrimagnetic particles as defined in claim 1, wherein Zn(II) ions are present, as further metal ions, in the magnetic core.

3. Ferrimagnetic particles as defined in claim 1, wherein Zn(II) ions are present, as further metal ions, in the magnetic coating.

* * * * *